(12) United States Patent  (10) Patent No.: US 9,400,651 B2
Gonion  (45) Date of Patent: Jul. 26, 2016

(54) EARLY ISSUE OF NULL-PREDICATED OPERATIONS

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 427 days.

(21) Appl. No.: 14/034,670

(22) Filed: Sep. 24, 2013

(65) Prior Publication Data

US 2015/0089191 A1     Mar. 26, 2015

(51) Int. Cl.
    *G06F 9/30*     (2006.01)
    *G06F 9/38*     (2006.01)

(52) U.S. Cl.
    CPC ........ *G06F 9/30036* (2013.01); *G06F 9/30018* (2013.01); *G06F 9/3836* (2013.01)

(58) Field of Classification Search
    CPC   G06F 9/3836; G06F 9/30018; G06F 9/30036
    See application file for complete search history.

(56) References Cited

U.S. PATENT DOCUMENTS

| | | | |
|---|---|---|---|
| 6,009,512 A * | 12/1999 | Christie | G06F 9/30072 712/218 |
| 7,395,419 B1 | 7/2008 | Gonion | |
| 7,617,496 B2 | 11/2009 | Gonion | |
| 7,620,797 B2 | 11/2009 | Gonion et al. | |
| 7,624,251 B2 | 11/2009 | Gonion et al. | |
| 7,739,442 B2 | 6/2010 | Gonion | |
| 7,975,134 B2 | 7/2011 | Gonion | |
| 8,019,976 B2 | 9/2011 | Gonion et al. | |
| 8,019,977 B2 | 9/2011 | Gonion et al. | |
| 8,060,728 B2 | 11/2011 | Gonion et al. | |
| 8,078,847 B2 | 12/2011 | Gonion et al. | |
| 8,131,979 B2 | 3/2012 | Gonion et al. | |
| 8,176,299 B2 | 5/2012 | Gonion et al. | |
| 8,181,001 B2 | 5/2012 | Gonion et al. | |
| 8,271,832 B2 | 9/2012 | Gonion et al. | |
| 8,356,159 B2 | 1/2013 | Gonion et al. | |
| 8,356,164 B2 | 1/2013 | Gonion et al. | |
| 8,359,460 B2 | 1/2013 | Gonion et al. | |
| 8,359,461 B2 | 1/2013 | Gonion et al. | |
| 8,364,938 B2 | 1/2013 | Gonion et al. | |
| 8,370,608 B2 | 2/2013 | Gonion et al. | |
| 8,402,255 B2 | 3/2013 | Gonion et al. | |

(Continued)

OTHER PUBLICATIONS

Po-Yung Chang, et al "Using Predicated Execution to Improve the Performance of a Dynamically Scheduled Machine with Speculative Execution", pp. 1-10.

(Continued)

*Primary Examiner* — Farley Abad
(74) *Attorney, Agent, or Firm* — Meyertons, Hood, Kivlin, Kowert & Goetzel, P.C.; Lawrence J. Merkel

(57) ABSTRACT

In an embodiment, a processor includes an issue circuit configured to issue instruction operations for execution. The issue circuit may be configured to monitor the source operands of the instruction operations, and to issue instruction operations for which the source operands (including predicate operands, as appropriate) are resolved. Additionally, the issue circuit may be configured to detect a null predicate that indicates that none of the vector elements will be modified by a corresponding instruction operation. The issue circuit may be configured to issue the corresponding instruction operation with the null predicate even if other source operands are not yet resolved.

20 Claims, 9 Drawing Sheets

(56) References Cited

U.S. PATENT DOCUMENTS

| | | | |
|---|---|---|---|
| 8,412,914 B2 | 4/2013 | Gonion | |
| 8,417,921 B2 | 4/2013 | Gonion et al. | |
| 8,447,956 B2 | 5/2013 | Gonion et al. | |
| 8,464,031 B2 | 6/2013 | Gonion | |
| 8,484,443 B2 | 7/2013 | Gonion | |
| 8,504,806 B2 | 8/2013 | Gonion | |
| 8,527,737 B2 | 9/2013 | Gonion | |
| 8,527,742 B2 | 9/2013 | Gonion | |
| 8,539,205 B2 | 9/2013 | Gonion | |
| 2005/0223201 A1* | 10/2005 | Tremblay | G06F 9/383 712/235 |
| 2005/0251665 A1* | 11/2005 | Chaudhry | G06F 9/3824 712/228 |
| 2008/0168260 A1* | 7/2008 | Zyuban | G06F 9/3838 712/214 |
| 2008/0288744 A1* | 11/2008 | Gonion | G06F 9/30072 711/210 |
| 2010/0042789 A1* | 2/2010 | Gonion | G06F 8/4441 711/154 |

OTHER PUBLICATIONS

Eric Sprangle et al "Facilitating Superscalar Processing via a Combined Static/Dynamic Register Renaming Scheme" University of Michigan, 1994, pp. 1-5.

* cited by examiner

| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

Fig. 8A

| x = | 0 | 1 | 2 | 3 | 4 | 5 | 6 | 7 |
|---|---|---|---|---|---|---|---|---|
| A[x] = | 1 | 10 | 16 | 16 | 26 | 29 | 9 | 1 |
| r = A[x+s] = | 1 | | | | | | | |
| s = A[x+r] = | | 16 | 16 | 26 | 29 | 9 | | |
| r = A[x+s] = | | | | | | | 13 | 0 |
| B[x] = | 1 | 17 | 17 | 27 | 30 | 10 | 22 | 9 |

| x = | 8 | 9 | 10 | 11 | 12 | 13 | 14 | 15 |
|---|---|---|---|---|---|---|---|---|
| A[x] = | 20 | 0 | 16 | 14 | 20 | 14 | 22 | 13 |
| s = A[x+r] = | 20 | | | | | | | |
| r = A[x+s] = | | 17 | | | | | | |
| s = A[x+r] = | | | 9 | 1 | 17 | 19 | 15 | 30 |
| B[x] = | 20 | 37 | 26 | 18 | 34 | 36 | 32 | 47 |

Fig. 8B

Source Code

```
r = 0 ;
s = 0 ;
for (x=0; x<KSIZE; ++x)
{
    if (A[x] < FACTOR)
    {
        r = A[x+s] ;
    }
    else
    {
        s = A[x+r] ;
    }
    B[x] = r + s ;
}
```

Fig. 9A

Vectorized Code

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

Fig. 9B

Example 2A
Vectorized
(Non-Speculative)

```
j = 0;
x = VectorIndex (0,1) ;
goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1, kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

Fig. 10A

Example 2B
Vectorized
(Speculative)

```
j = 0;
x = VectorIndex (0,1) ;
goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1, kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

Fig. 10B

Example 3
Vectorized

```
        x = VectorIndex (0,1) ;
        goto Loop1Tail ;
Loop1:
    ~p0; r = VectorReadInt(C,x);
    ~p0; s = VectorReadInt (D, x) ;
    i1 = CheckHazardP(r,x,p0);
    i2 = CheckHazardP(s,x,p0);
    i3 = VectorMax(i1,i2);
    p4 = 0 ;
Loop2:
    ~p0; p4 = GeneratePredicates (p4, i3) ;
    ~p4; t1 = VectorReadInt(A,r) ;
    ~p4; t2 = VectorReadInt(A,s);
    ~p4; t3 = t1 + t2 ;
    ~p4; VectorWriteInt(A,x,t3);
    ~p0; if (!CARRY( )) goto Loop2;
    x += VECLEN;
Loop1Tail:
    p0 = (x < KSIZE) ;
    if ( FIRST (p0) ) goto Loop1 ;
```

Fig. 11

Example 4
Vectorized

```
            x = VectorIndex (0,1) ;
            goto Loop1Tail ;
    Loop1:
        j = PropagatePriorF(j,p0);
        ~p0; f = VectorReadInt(A,x);
        ~p0; g = VectorReadInt (B, x) ;
        !p0; p1 = (f < FACTOR);
        !p0; p2 = (g < FACTOR);
        ~p1; h = VectorReadInt(C,x);
        ~p2; i = VectorReadInt(D,x);
        !p1; ix = CheckHazardP(h,i,p2);
        p3 = 0 ;
    Loop2:
        p3 = GeneratePredicates (p3, ix) ;
        !p3; p4 = p1 + 0;
        !p3; p5 = p2 + 0;
        ~p4; j = VectorReadInt(E,h);
        j = CopyPropagate(j,j,p4);
        ~p5; VectorWriteInt(E,i,j);
        ~p0; if (!LAST(p3)) goto Loop2;
        x += VECLEN;
    Loop1Tail:
        p0 = (x < KSIZE) ;
        if ( FIRST (p0) ) goto Loop1 ;
```

EARLY ISSUE OF NULL-PREDICATED OPERATIONS

BACKGROUND

1. Field of the Invention

This invention is related to the field of processors and, more specifically, to processors that execute predicated vector instructions.

2. Description of the Related Art

Vector processors exploit data-level parallelism (DLP) by performing the same operation on multiple vector elements in a source operand or operands. One issue that has prevented large-scale adoption of vector processors is the difficulty of vectorizing loops. To support loop vectorization, a vector instruction set has been proposed which includes predication on the vector elements. Thus, some vector elements may be operated upon while others are not (e.g. the results in inactive vector positions may be the previous value in that position or zero). Generally, a predicated vector instruction cannot be scheduled until its source operands and predicate operand are all known to be available either in the register file or forwarded to the instruction in the pipeline between scheduling and execution.

SUMMARY

In an embodiment, a processor includes an issue circuit configured to issue instruction operations for execution. The issue circuit may be configured to monitor the source operands of the instruction operations, and to issue instruction operations for which the source operands (including predicate operands, as appropriate) are resolved. Additionally, the issue circuit may be configured to detect a null predicate that indicates that none of the vector elements will be modified by a corresponding instruction operation. The issue circuit may be configured to issue the corresponding instruction operation with the null predicate even if other source operands are not yet resolved.

BRIEF DESCRIPTION OF THE DRAWINGS

The following detailed description makes reference to the accompanying drawings, which are now briefly described.

FIG. 8A is a diagram illustrating a sequence of variable states during scalar execution of the loop shown in Example 1.

FIG. 8B is a diagram illustrating a progression of execution for Macroscalar vectorized program code of the loop of Example 1.

FIG. 9A and FIG. 9B are diagrams illustrating one embodiment of the vectorization of program source code.

FIG. 10A is a diagram illustrating one embodiment of non-speculative vectorized program code.

FIG. 10B is a diagram illustrating another embodiment of speculative vectorized program code.

FIG. 11 is a diagram illustrating one embodiment of vectorized program code.

FIG. 12 is a diagram illustrating another embodiment of vectorized program code.

Figure 1:
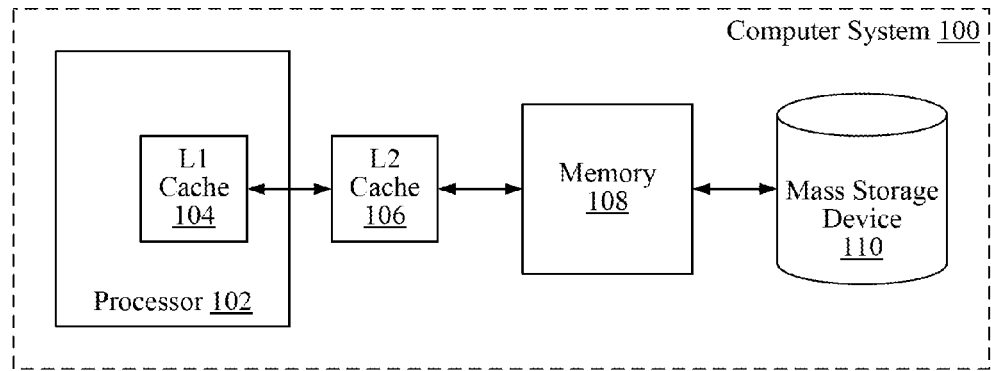
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). As described further below, processor 102 may include one or more mechanisms for vector processing (e.g., vector execution units). The processor 102 may be a standalone component, or may be integrated onto an integrated circuit with other components (e.g. other processors, or other components in a system on a chip (SOC)). The processor 102 may be a component in a multichip module (MCM) with other components.

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage devices.

Processor

Figure 2:
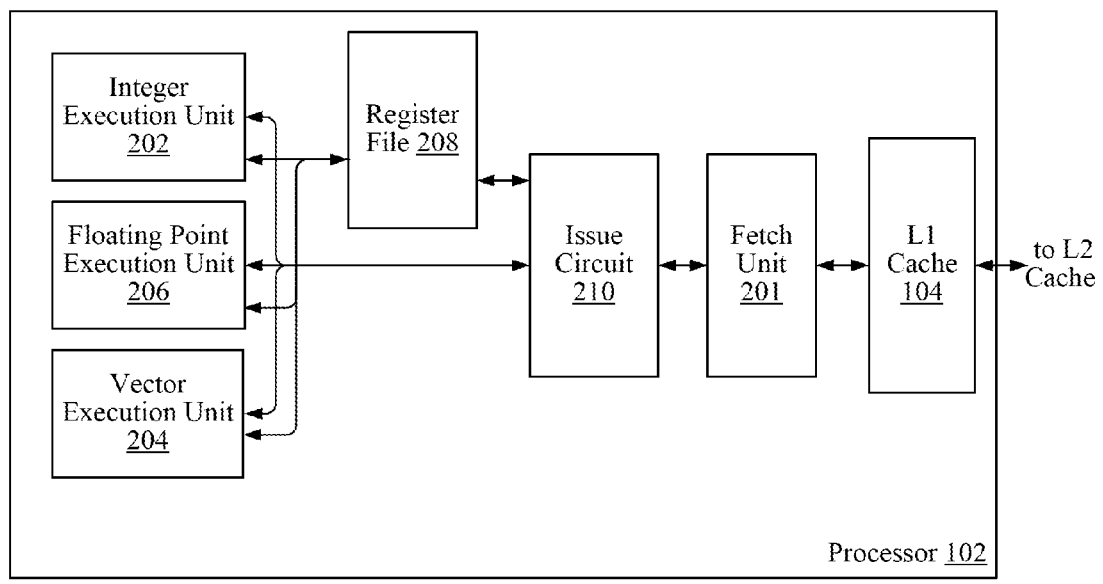
FIG. 2 is a block diagram illustrating additional details of an embodiment of the processor shown in FIG. 1.

Referring to FIG. 2, a block diagram illustrating additional details of an embodiment of the processor 102 of FIG. 1 is shown. In the embodiment shown in FIG. 2, the processor 102 may include a number of pipeline stages, although for brevity not all are shown in FIG. 2. In the illustrated embodiment, the processor 102 includes the L1 cache 104, an instruction fetch unit 201, a register file 208, an issue circuit 210, an integer execution unit 202, a floating-point execution unit 206, and a vector execution unit 204. It is noted that the integer execution unit 202, floating-point execution unit 206, and vector execution unit 204 as a group may be interchangeably referred to as "the execution units."

The fetch unit 201 may be configured to fetch instructions from the L1 Cache 104. The fetch unit 201 may include various branch prediction mechanisms, next fetch predictors, and/or other speculative instruction stream mechanisms that permit fetching down a speculative instruction path to provide instructions for execution. The fetch unit 201 may include decode circuitry as well to decode the instructions, in some embodiments. An instruction stream may generally be a set of instructions arranged for execution to accomplish an overall task. The stream may be executed out-of-order if the processor 102 implements out of order processing. The stream may not necessarily be stored at consecutive addresses in memory, as branches and the like may cause fetching to continue at different addresses than the next sequential address.

An instruction may be an executable entity defined in an instruction set architecture implemented by the processor 102. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 102. Some instructions may be microcoded, in some embodiments. Accordingly, the term "instruction operation" may be used herein to refer to an operation that an execution unit in the processor 102 is configured to execute as a single entity. Instructions may have a one to one correspondence with instruction operations, and in some cases an instruction operation may be an instruction (possibly modified in form internal to the processor 102). Instructions may also have a one to more than one (one to many) correspondence with instruction operations. An instruction operation may be more briefly referred to herein as an "op."

In various embodiments, the execution units may perform computational operations such as logical operations, mathematical operations, or bitwise operations, for example, for an associated type of operand. More specifically, the integer execution unit 202 may perform computational operations that involve integer operands, the floating-point execution unit 206 may perform computational operations that involve floating-point operands, and the vector execution unit 204 may perform computational operations that involve vector operands. Any suitable configurations maybe employed for the integer execution unit 202 and the floating-point execution unit 206, depending on the particular configuration of architectural and performance parameters governing a particular processor design. As noted above, although the embodiment of the processor 102 shown in FIG. 2 includes a particular set of components, it is contemplated that in alternative embodiments the processor 102 may include different numbers or types of execution units, functional units, and pipeline stages such as an instruction decode unit, a scheduler or reservations station, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described herein may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the register file 208 may include vector registers that can hold operand vectors and result vectors for the vector execution unit 204. In some embodiments, there may be 32 vector registers in the register file 208, and each vector register may include 128 bits. However, in alternative embodiments, there may be different numbers of vector registers and/or different numbers of bits per register. The vector registers may further include predicate vector registers that may store predicates for the vector instructions, and may also store one or more vector attributes as described in further detail below. Furthermore, embodiments which implement register renaming may include any number of physical registers that may be allocated to architected vector registers and architected predicate vector registers. Architected registers may be registers that are specifiable as operands in vector instructions. The register file 208 may further include registers for the integer execution unit 202 and the floating point execution unit 206. The register file 208 may be representative of multiple register files (e.g. different register files for different operand types), or may be a unified register file that may be used for operands of various types.

The vector execution unit 204 may be configured to retrieve operands from the vector registers and to execute vector ops that include the vector execution unit 204 to performing operations in parallel on some or all of the data elements in the operand vector. For example, the vector execution unit 204 may perform logical operations, mathematical operations, or bitwise operations on the elements in the vector. The vector execution unit 204 may perform one vector op per instruction cycle (although a "cycle" may include more than one clock cycle that may be used to trigger, synchronize, and/or control the vector execution unit 204's computational operations).

In one embodiment, the vector execution unit 204 may support vectors that hold N data elements (e.g., bytes, words, doublewords, etc.), where N may be any positive whole number. In these embodiments, the vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of the processor 102.

In some embodiments, as described in greater detail below, based on the values contained in a predicate vector or one or more scalar predicates, the vector execution unit 204 applies vector operations to selected vector data elements only. In some embodiments, the remaining data elements in a result vector remain unaffected (which may also be referred to as "masking") or are forced to zero (which may also be referred to as "zeroing" or "zeroing predication"). In some embodiments, the clocks for the data element processing subsystems ("lanes") that are unused due to predication or zeroing in the vector execution unit 204 can be power and/or clock-gated, thereby reducing dynamic power consumption in the vector execution unit 204. Generally a predicate may refer to a value that indicates whether or not an operation is to be applied to a corresponding operand value to produce a result. A predicate may, e.g., be a bit indicating that the operation is to be applied in one state and not applied in the other state. For example, the set state may indicate that the operation is to be applied and the clear state may indicate that the operation is not to be applied (or vice versa). Vector elements to which the operation is to be applied may be referred to as "active" elements, while vector elements to which the operation is not to be applied may be referred to as "inactive" elements.

A given predicate vector may be null. A null predicate vector may indicate that the entire corresponding vector is not to be operated upon. For example, each predicate element may indicate that a corresponding vector element is inactive. In general, a predicate operand of an op may apply to the source vectors of the op. Some ops may include separate predicate vectors for each source vector, but if only one predicate vector is provided it may apply to each source vector. A given op may include one or more source vectors, and a result vector may be generated to be stored at a destination of the op (e.g. a destination register, or result register).

In various embodiments, the architecture may be vector-length agnostic to allow it to adapt parallelism at runtime. More particularly, when instructions or ops are vector-length agnostic, the operation may be executed using vectors of any length. A given implementation of the supporting hardware may define the maximum length for that implementation. For example, in embodiments in which the vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., the vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

While the instruction set architecture may specify that vector instructions are vector length agnostic, vector attributes may be useful to the vector hardware. In an embodiment, the predicate vector registers may store both the predicates and one or more vector attributes for the corresponding vector operation. The vector attribute may generally specify any architected and/or implementation-specific size information. For example, in an embodiment, vector attributes may specify at least one of a vector element size (specifying one of a set of supported vector element sizes for a particular operation), vector size (e.g. size of the vector registers, e.g. in bits or bytes), number of vector elements per vector, number of elements per partition, number of partitions per vector, or partition size. A partition may be a subset of a vector on which certain operations are defined to operation. For example, a vector operation that reverses the order of the vector elements may operate on partitions within the vector register, reversing the order within each partition.

Figure 3:
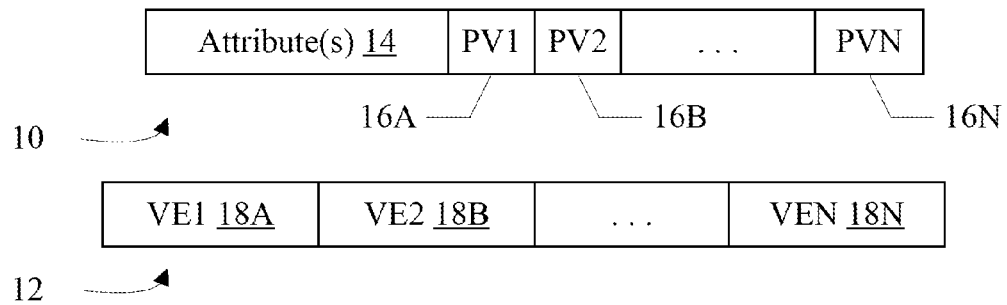
FIG. 3 is a block diagram of one embodiment of a predicate vector register and a vector register.

In an embodiment, the predicate vector registers may be architected to store one or more vector attributes, and the vector registers may store vector elements (N elements, where N is implementation-specific). FIG. 3 is a block diagram illustrating an exemplary predicate vector register 10 and an exemplary vector register 12 as architected according to one embodiment of the instruction set architecture implemented by the processor 102. As illustrated in FIG. 3, the predicate vector register 10 includes an attributes field 14 and N predicate fields 16A-16N. The N predicate fields correspond to the N vector element fields 18A-18N of the vector register 12. That is, each predicate element of the predicate vector may correspond to a respective vector element of a corresponding vector.

The issue circuit 210 may be coupled to receive ops and may be configured to schedule ops for execution by the execution units. Generally, the issue circuit 210 may be configured to monitor the ops held by the issue circuit 210, identifying ops for which the source operands are "ready" and scheduling the oldest ops that are ready and for which execution resources (e.g. execution units) are available to execute the ops. Particularly, based on the execution latency of a given op, the issue circuit 210 may determine when the ops that depend on the destination register of the given op are ready (at least with respect to the dependency on the given op). The dependent ops may be scheduled, at the earliest, such that they arrive at the execution stage at a time when the source operands may be forwarded to the execution stage. There may be one or more pipeline stages between issue and execution (e.g. a register file read stage to read the register file 208) and the ops may be scheduled based on the pipeline delays as well as the execution latency of the ops providing the operands.

Operands may be "ready" if the operands have been written to their destination registers or if the operands will be forwarded to the dependent ops prior to or coincident with execution. Various embodiments may determine "ready" differently based on forwarding capabilities. Viewed in another way, an instruction operation may be scheduleable/issueable for execution if the dependencies for its operands have been resolved. A dependency may be resolved if the value has been written to the source operand by the producing operation. A dependency may be resolved if, based on the execution latency of the producing operation and when it was issued, the source operand will be forwarded to the op if the op is scheduled and issued into the pipeline to the execution unit. In some embodiments, a source operand may be captured by the issue circuit. In such embodiments, the source operand dependency may be resolved if the source operand has been captured. Dependencies that have not reached the above state may be referred to as "unresolved."

In an embodiment, the issue circuit 210 may be configured to capture the source predicate vector for an op, and may detect null predicate vectors (e.g. predicate vectors that indicate that the entire source vectors are not to be operated upon). Alternatively, the predicate vector may not be captured by the issue circuit 210 may be provided within an indication that the predicate vector is null. In either case, the result of the op is known for a null predicate vector (e.g. it is zero or the previous value in the destination vector register). The issue circuit 210 may be configured to issue the op for execution prior to resolving dependencies for one or more of the source operand vectors in the case that the null predicate vector is detected. In this fashion, the op may clear the issue circuit 210 and any dependent instructions more rapidly than if issue circuit 210 waited for the source operand vectors to resolve before issuing the op.

The vector execution unit 204 may be configured to execute the op. In the case that the predicate vector is null, the vector execution unit 204 may be configured to execute the op independent of the source vectors. That is, the result vector may be zero (in the case of zeroing predication) or may be the previous value of the destination register (in the case of masking predication). For the masking case, the issue circuit 210 may be configured to detect the null predicate vector and to detect that the previous destination value is ready. That is, for the masking case, the issue circuit 210 may have a dependency on the destination register of the op, and may wait for the destination dependency to resolve before issuing the op. Thus, the vector execution unit 204 may be configured to generate a result vector of zero or a result vector equal to the previous value of the destination in response to an op having a null predicate. In other cases (i.e. non-null predicate vectors), a combination of zero (or unmodified destination) vector elements and vector elements generated from corresponding source vector elements may be the result vector generated by the execution unit 204.

In an embodiment, the vector attribute(s) from the predicate vector register of the op may be used to qualify the predicate vector. For example, the number of predicates may be determined based on the vector attribute. If the vector attribute is an element size, the element size and the implemented size of the vector register may indicate the number of vector elements (and thus the number of predicate vector elements). If the vector attribute is a number of vector elements, then the vector attribute directly determines the number of predicate vector elements. The predicate vector register may include storage for up to the maximum supported predicate vector elements, but the number that need to be inactive to be a null predicate vector may be based on the vector attribute(s). For example, predicate vector element storage locations within the predicate vector register may be masked based on the number of vector elements.

Generally, an issue circuit may be any circuitry configured to receive ops and schedule the ops for execution. An issue circuit may be centralized (e.g. a centralized scheduler or centralized reservation station) that schedules ops for execution in all execution units. An issue circuit may also be decentralized (e.g. reservation stations) that receive and schedule ops of a particular type and/or ops for a particular execution unit. Any issue circuitry may be implemented in various embodiments.

The L1 cache 104 may be illustrative of any caching structure. For example, the L1 cache 104 may be implemented as a Harvard architecture (separate instruction cache for instruction fetching by the fetch unit 201 and data cache for data read/write by execution units for memory-referencing ops), as a shared instruction and data cache, etc. In some embodiments, load/store execution units may be provided to execute the memory-referencing ops. The load/store execution units may be coupled to the issue circuit 210 and to the data L1 cache.

Figure 4:
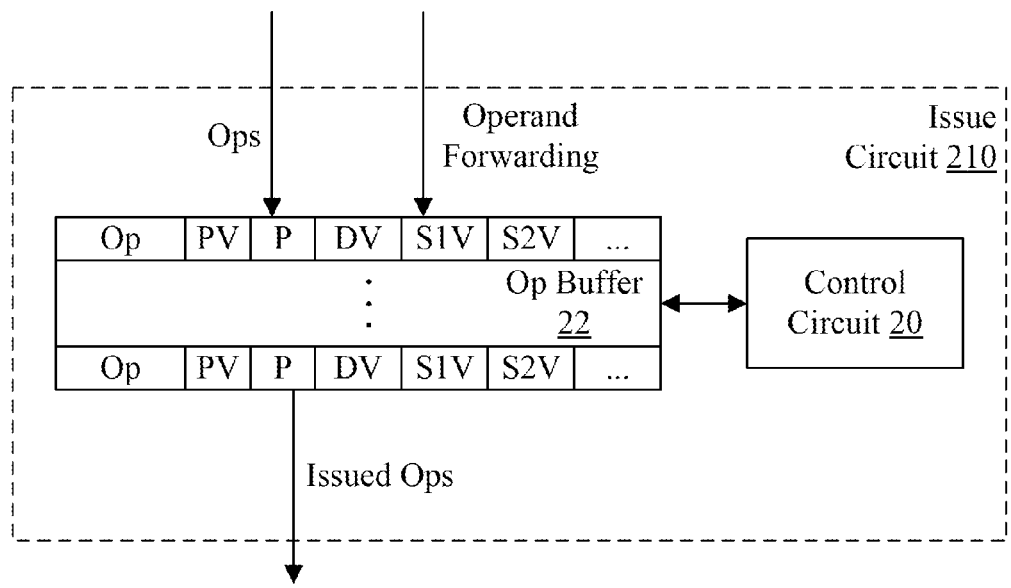
FIG. 4 is a block diagram of one embodiment of the issue circuit shown in FIG. 2.

FIG. 4 is a block diagram of one embodiment of the issue circuit 210. In the illustrated embodiment, the issue circuit 210 includes a control circuit 20 and an op buffer 22. The op buffer 22 may be coupled to the control circuit 20, and may be coupled to receive the ops output from the fetch unit 201 and operand forwarding information from various execution units. The op buffer 22 is configured to transmit issue ops to execution unit(s) for execution.

The op buffer 22 may include an entry for each op that may be concurrently stored therein. Exemplary op buffer entries illustrated in FIG. 4 include an op field for the op itself, a predicate field (P) for the predicate vector associated with the op, and various valid fields for operands (e.g. PV for the vector predicate, DV for the destination, S1V for source operand 1, S2V for source operand 2, etc.). The op field may include the op and various other information (e.g. register addresses for the physical registers assigned by the register renamer if any, architected registers addresses if register renaming is not in use, etc.).

The valid field for each operand may indicate whether or not the dependency is resolved for that operand. For example, the valid field may be, e.g., a bit indicating in one state that the dependency is resolved and indicating in the opposite state that the dependency is unresolved. The set state may indicate resolved and the clear state unresolved, or vice-versa. Valid bits may be set upon writing the op into the buffer 22, in the case that the corresponding operand is already in the register file 208 or will be forwarded prior to execution of the op even if it was issued immediately.

In response to receiving an op, the control circuit 20 may allocate an entry in the op buffer 22 to store the op and related data. The op may be written to the op field in the allocated entry. The operand valid fields may be initialized based on information provided with the op (e.g. from a register renamer) indicating which source registers were previously written with results. In some embodiments, the issue circuit 210 may be in the pipeline after the register file read stage, and the op buffer 22 may further include storage for the operands themselves. In other embodiments, the issue circuit 210 may be in the pipeline before the register file read stage, e.g. as illustrated in FIG. 2. In such cases, the issue circuit 210 generally need not store the operands.

On the other hand, in the present embodiment, the control circuit 20 may use the predicate vector in scheduling (e.g. by detecting the null predicate vector, the control circuit 20 may be configured to schedule/issue the op even though one or more other source operands may not have resolved dependencies yet). Accordingly, while other operands need not be stored in the op buffer 22, the predicate vector may be captured in the entry. Alternatively, the op buffer 22 may receive an indication of whether or not the predicate vector is null (e.g. from the execution units, or from the fetch unit 201 for predicate vectors that are available on dispatch by the fetch unit 201). In such embodiments, the state of the null indication may be captured in the entry.

The issue circuit 210 may be configured to receive operand forwarding information from execution units, in some embodiments. The operand forwarding information may include the register address for which data is being forwarded (or will be forwarded in a subsequent clock cycle at a forwarding stage between the execution units and the issue circuit 210), and may optionally include the forwarded data for cases in which the op buffer 22 stores the forwarded data. The control circuit 20 may be configured to update the valid fields in the op buffer entries based on the forwarding information and matching forwarded register addresses to register addresses of the stored ops.

The issue circuit 210 may be configured to track dependency resolution for destination operands as well, as mentioned above. In the case of masking predication, the previous vector elements of the destination are retained unmodified for the inactive elements. Thus, the destination is also a source in the masking case. The issue circuit 210 may track resolution of the destination dependency in the same fashion as other source operands. In an embodiment, for the zeroing predication case, the destination resolution may not be an issue and may be ignored by the control circuit 20. In another embodiment, the destination valid bit may be set by the fetch unit 201 for the zeroing predication case.

The op buffer 22 may be formed out of any type of storage devices. For example, the op buffer 22 may be formed from SRAM, registers, latches, flops, or any other clocked storage devices.

Figure 5:
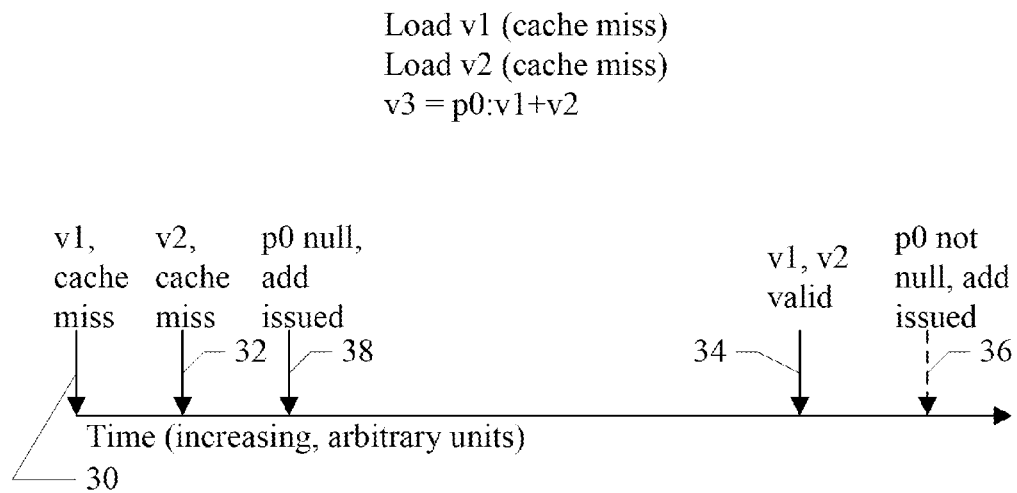
FIG. 5 a diagram illustrating an example of early issue for a null predicate.

FIG. 5 is a diagram illustrating an example in which performance may be gained by issuing an op before the dependencies on source operands are resolved in the case that the predicate vector is null. FIG. 5 includes an exemplary code sequence in which program order flows down the page. Accordingly, the two load ops occur in program order before the add op. The load ops load vectors into destination vector registers v1 and v2. The add op uses v1 and v2 as source registers, predicated by the predicate vector in the predicate vector register p0. The result is written to the vector register v3.

FIG. 5 also includes a timing diagram, with time increasing in arbitrary units from left to right. As illustrated parenthetically in the code sequence, both load ops are cache misses. Accordingly, a relatively long delay may occur before the data returns to the cache and can be forwarded to the vector registers v1 and v2, illustrated by the arrows 30 and 32 on the left in FIG. 5 for the load ops executing and detecting misses and the arrow 34 on the right for the data forwarding. If the p0 vector is not null, the add op would issue subsequent to the forwarding of the data (or possibly coincident with or slightly before the forwarding of the data, if the load data can be forwarded to the add op in the pipeline). The scheduling of the add op for a non-null predicate vector is illustrated via the dotted arrow 36 to the right in FIG. 5. A similar issue exists if either load op is a cache miss even if the other load op is a cache hit, since both source operands generally need to be resolved before issuing the add op.

On the other hand, if the p0 dependency resolves and p0 is a null predicate vector, the add op may be issued earlier, e.g. at the arrow 38 in FIG. 5. Ops that depend on the add op may thus have their dependencies resolved sooner, and may issue sooner. Overall performance may be increased for the processor 102.

Figure 6:
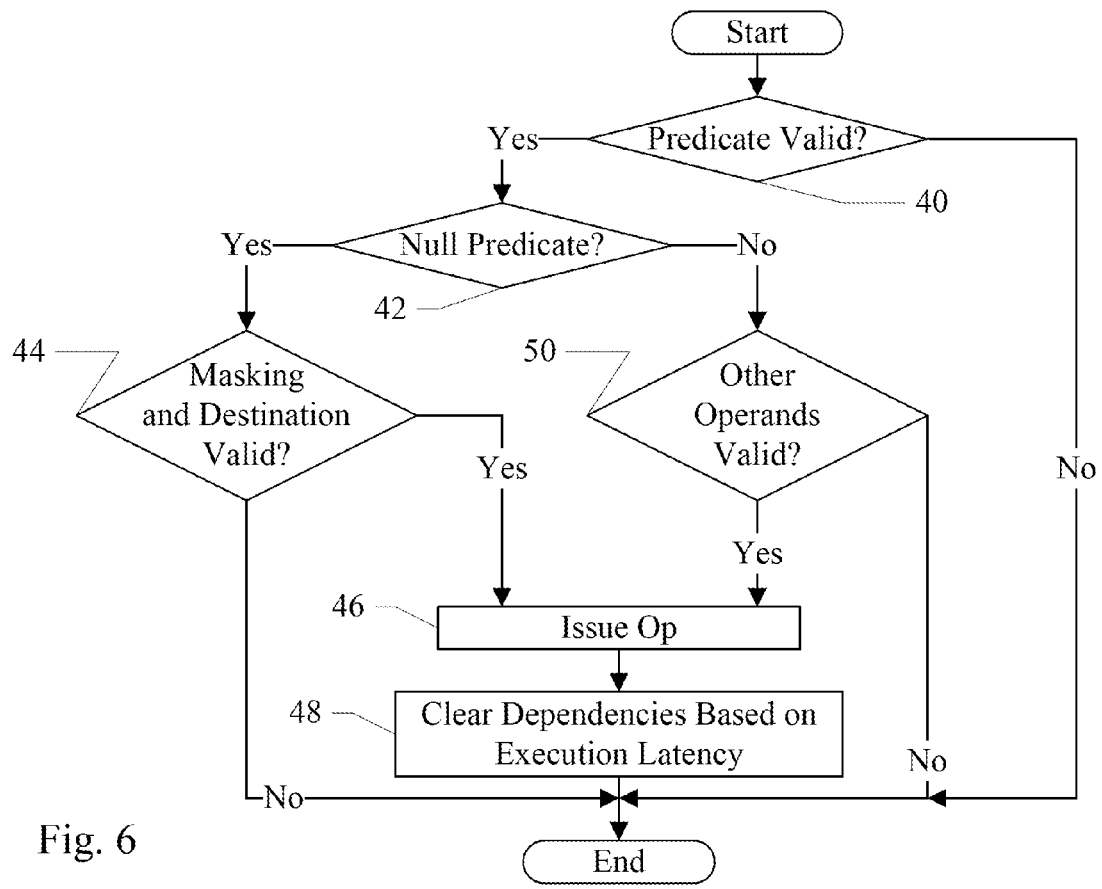
FIG. 6 is a flowchart illustrating operation of one embodiment of the issue circuit shown in FIG. 4.

FIG. 6 is a flowchart illustrating operation of one embodiment of the issue circuit 210 (and more particularly the control circuit 20, in an embodiment). While the blocks are shown in a particular order for ease of understanding, other orders may be used. Blocks may be performed in parallel in combinatorial logic within the issue circuit 210/control circuit 20. Blocks, combinations of blocks, and/or the flowchart as a whole may be pipelined over multiple clock cycles. The issue circuit 210/control circuit 20 may be configured to implement the operation illustrated in FIG. 6. The operation illustrated in FIG. 6 may correspond to one entry in the op buffer 22. Similar operation may be performed in parallel for other entries, and the oldest entry which may be issued may issue the op as illustrated in block 46.

If the predicate register operand is not valid (decision block 40, "no" leg), the op may not be ready for issue. If the predicate register operand is valid (decision block 40, "yes" leg), and is null (decision block 42, "yes" leg), and for masking predication the destination is valid (decision block 44, "yes" leg), the issue circuit 210/control circuit 20 may be configured to issue the op (block 46). Particularly, in this case, the op may be issued even in the case that other source operands (e.g. source vectors) are not yet valid. Based on the execution latency of the op, the pipeline between the issue circuit 210 and the execution units, etc., the issue circuit 210/control circuit 20 may clear dependencies of other ops on the issued op (block 48). In some embodiments, as previously discussed, the predicate vector may be qualified by the vector attribute(s) before checking the predicate vector for null. If the predicate register is valid (decision block 40, "yes" leg) and not null (decision block 42, "no" leg) but the other operands of the op are valid (decision block 50, "yes" leg), the issue circuit 210/control circuit 20 may be configured to issue the op (block 46) and, based on execution latency and other factors as mentioned above, may clear the dependencies of other ops on the issued op (block 48). In the null predicate but masking predication with no destination valid case (decision blocks 40 and 42, "yes" leg and decision block 44, "no" leg) and the non-null predicate but other operands not valid case (decision block 40, "yes" leg and decision blocks 42 and 50, "no" legs), the op may not be ready to issue.

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 7.

Figure 7:
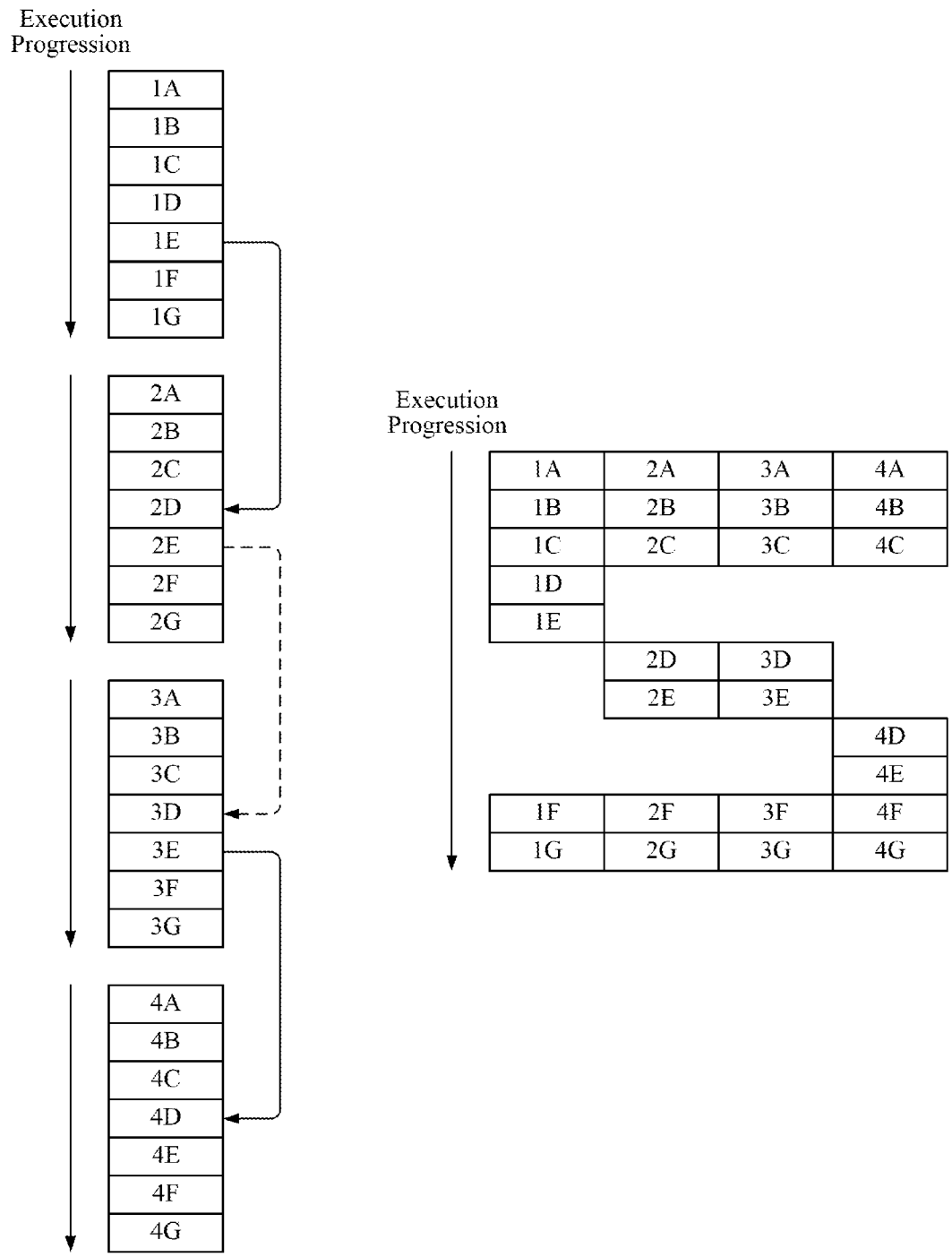
FIG. 7 is a diagram illustrating an example parallelization of a program code loop.

Referring to the left side of FIG. 7, an execution pattern is shown with four iterations (e.g., iterations 1-4) of a loop that have not been parallelized, where each loop includes instructions A-G. Serial operations are shown with instructions vertically stacked. On the right side of FIG. 7 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 7, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 7 and described above in the parallelized loop example. For ease of understanding, these examples are presented using pseudocode in the C++ format.

It is noted that the following example embodiments are for discussion purposes. The instructions and operations shown and described below are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 may be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

```
if (FIRST( )) goto ..;  //  Also LAST( ),  ANY( ),
ALL( ), CARRY( ), ABOVE( ), or NONE( ), (where ANY(
) == !NONE( ))
```

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A[x]<FACTOR) is known to be always true or always false. These assumptions change when the condition is allowed to vary during execution (the common case). For simplicity in this example, we presume that no aliasing exists between A[ ] and B[ ].

Example 1

| Program Code Loop |
| --- |
| r = 0;<br>s = 0;<br>for (x=0; x<KSIZE; ++x)<br>{<br>  if (A[x] < FACTOR)<br>  {<br>    r = A[x+s];<br>  }<br>  else<br>  {<br>    s = A[x+r];<br>  }<br>  B[x] = r + s;<br>} |

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

$x$=VectorIndex(0,1);//$x$={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

| Entry: | dest | = {8 9 A B C D E F} |
| | src | = {1 2 3 4 5 6 7 8} |
| | pred | = {0 0 1 1 0 0 1 0} |
| Exit: | dest | = {8 9 A B 4 4 E 7} | dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

| Entry: | src | = {1 2 3 4 5 6 7 8} |
| | pred | = {1 0 1 1 0 0 1 0} |
| Exit: | dest | = {8 2 2 2 5 6 6 8} | dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

| p1 = (t < FACTOR); | // p1 = {00001100} |
| p2 = ConditionalStop(p1, kTF|kFT); | // p2 = {00004060} |

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of Pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

| Entry Conditions: | // i2 = {0 0 0 0 4 0 6 0} |
| p2 = 0; | // p2 = {0 0 0 0 0 0 0 0} |
| Loop2: | |
| p2 = GeneratePredicates(p2,i2); | // p2' = {1 1 1 1 0 0 0 0} |
| CF = 0, ZF = 0 | |
| if(!PLAST( )) goto Loop2 | // p2'' = {0 0 0 0 1 1 0 0} |
| CF = 0, ZF = 0 | |
| | // p2''' = {0 0 0 0 0 0 1 1} |
| CF = 1, ZF = 0 | |

From an initialized predicate p2 of all zeros, GeneratePredicates generates new instances of p2 that partition subsequent vector calculations into three sub-vectors (i.e., p', p'', and p'''). This enables the hardware to process the vector in groups that avoid violating the data dependencies of the loop.

In FIG. 8A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 8B a diagram illustrating a progression of execution for Macroscalar vectorized program code of the loop of Example 1 is shown. In FIG. 8A and FIG. 8B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 8B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 9A and FIG. 9B, diagrams illustrating one embodiment of the vectorization of program code are shown. FIG. 9A depicts the original source code, while FIG. 9B illustrates the vectorized code representing the operations that may be performed using the Macroscalar architecture. In the vectorized code of FIG. 9B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

| Program Code Loop 1 |
|---|
| j = 0;<br>for (x=0; x<KSIZE; ++x)<br>{<br>  if (A[x] < FACTOR)<br>  {<br>    j = A[x+j];<br>  }<br>  B[x] = j;<br>} |

Example 2B

| Program Code Loop 2 |
|---|
| j = 0;<br>for (x=0; x<KSIZE; ++x)<br>{<br>  if (A[x+j] < FACTOR)<br>  {<br>    j = A[x];<br>  }<br>  B[x] = j;<br>} |

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

```
Entry:  pred = {0 0 1 0 1 0 0 0}
Exit:   dest = {0 0 0 0 0 1 1 1}
```

FIG. 10A and FIG. 10B are diagrams illustrating embodiments of example vectorized program code. More particularly, the code sample shown in FIG. 10A is a vectorized version of the code in Example 2A (as presented above). The code sample shown in FIG. 10B is a vectorized version of the code in Example 2B. Referring to FIG. 10B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 10A and FIG. 10B, there exists a loop-carried dependency between iterations where the condition is true, and subsequent iterations, regardless of the predicate value for the later iterations. This is reflected in the parameters of the ConditionalStop instruction.

The sample program code in FIG. 10A and FIG. 10B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

Example 3

```
Program Code Loop 3 for (x=0; x<KSIZE; ++x)
{
    r = C[x];
    s = D[x];
    A[x] = A[r] + A[s];
}
```

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP (first, second, pred)

The CheckHazardP instruction examines two vectors of a memory address (or indices) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluates write-after-read, read-after-write, and write-after-write memory hazards.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

```
Entry:  first  = {2 3 4 5 6 7 8 9}
        second = {8 7 6 5 4 3 2 1}
        pred   = {1 1 1 1 1 1 1 1}
Exit:   dest   = {0 0 0 0 3 2 1 0}
```

As shown above, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

| Entry Conditions: | //DIV = {0 0 0 0 3 2 1 0} |
| | // p2 = {0 0 0 0 0 0 0 0} |
| p2 = GeneratePredicates(p2,DIV); | // p2 = {1 1 1 1 0 0 0 0} |
| P2 = GeneratePredicates(p2,DIV) | // p2 = {0 0 0 1 1 1 1} |

The process used by the described embodiments to analyze a DIV to determine where a vector should be broken is shown in pseudocode below. In some embodiments, the vector execution unit 204 of processor 102 may perform this calculation in parallel. For example:

```
List = <empty>;
for (x=STARTPOS; x<VECLEN; ++x)
{
  if(DIV[x] in List)
    Break from loop;
  else if(DIV[x]>0)
    Append <x> to List;
}
```

The vector may safely be processed in parallel over the interval [STARTPOS,x), where x is the position where DIV[x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

| i2 = CheckHazardP(a,c,p0); | //i2 = {0 0 2 0 2 4 0 0} |
| i3 = CheckHazardP(b,c,p0); | //i3 = {0 0 1 3 3 0 0 0} |
| ix = VectorMax(i2,i3); | //ix = {0 0 2 3 3 4 0 0} |

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 11 is a diagram illustrating one embodiment of example vectorized program code. More particularly, the code sample shown in FIG. 11 is a vectorized version of the code in Example 3 (as presented above). Referring to FIG. 11, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 11, the hazard check is performed across the entire vector of addresses. In the general case, however, it is often necessary to check hazards between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 12 a diagram illustrating one embodiment of example vectorized program code is shown. More particularly, the code sample shown in FIG. 12 is a vectorized Macroscalar version of the code in Example 4 (as presented above).

Example 4

Program Code Loop 4

```
j = 0;
for (x=0; x<KSIZE; ++x)
{
  f = A[x];
  g = B[x];
  if (f < FACTOR)
  {
    h = C[x];
    j = E[h];
  }
  if (g < FACTOR)
  {
    i = D[x];
    E[i] = j;
  }
}
```

Referring to FIG. 12, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not the a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above.

Numerous variations and modifications will become apparent to those skilled in the art once the above disclosure is fully appreciated. It is intended that the following claims be interpreted to embrace all such variations and modifications.

What is claimed is:

1. A processor comprising:
an issue circuit configured to issue instruction operations for execution in the processor, wherein a first instruction operation in the issue circuit has a plurality of source operands including at least one predicate from a first predicate register and one or more vectors from one or more vector registers, and wherein the issue circuit is configured to issue the first instruction operation responsive to the at least one predicate being a null predicate and wherein the issue circuit is configured to issue the first instruction operation even in the case that at least one of the dependencies on the one or more vectors is unresolved when the first instruction operation is issued; and
a vector execution unit coupled to the issue circuit and configured to execute the first instruction operation independent of the one or more vectors having the unresolved dependencies, and further configured to forward a result of the first instruction operation to a dependent instruction operation in the issue circuit independent of the one or more vectors having the unresolved dependencies and prior to at least one of the unresolved dependencies being resolved.

2. The processor as recited in claim 1 wherein the at least one predicate comprises a predicate vector having a predicate element for each element of a corresponding vector, and where the null predicate indicates that no elements of the corresponding vector are operated upon during execution of the first instruction operation.

3. The processor as recited in claim 2 wherein the predicate register further comprises a vector attribute field storing a vector attribute, and wherein the issue circuit is configured to issue the first instruction further responsive to the vector attribute.

4. The processor as recited in claim 3 wherein the issue circuit is configured to qualify the predicate vector with the vector attribute.

5. The processor as recited in claim 4 wherein the issue circuit is configured to determine a number of elements in the predicate vector responsive to the vector attribute.

6. The processor as recited in claim 5 wherein the number of elements in the predicate vector is equal to the number of elements in each of the one or more vectors.

7. The processor as recited in claim 1 wherein the result of the first instruction operation is a zero vector, wherein the processor comprises an execution unit configured to execute the first instruction operation and configured to generate the zero vector responsive to the null predicate.

8. The processor as recited in claim 1 wherein the first instruction operation specifies masking of the result of the first instruction operation, and wherein the issue circuit is configured to issue the first instruction operation further responsive to a destination register of the first instruction operation being resolved.

9. The processor as recited in claim 8 wherein the vector execution unit is configured to propagate a previous value of the destination register as the result of the first instruction operation responsive to the null predicate vector.

10. A processor comprising:
an issue circuit configured to issue instruction operations for execution in the processor, wherein a first instruction operation in the issue circuit includes a plurality of source operands including a first predicate vector from a first predicate vector register and one or more vectors from one or more vector registers, and wherein the issue circuit is configured to issue the first instruction operation responsive to at least one of the dependencies on the one or more vectors being unresolved and further responsive to each predicate element in the first predicate vector indicating that a corresponding vector element is inactive, and wherein the first predicate vector register further comprises a vector attribute field storing a vector attribute, and wherein the issue circuit is configured to issue the first instruction operation further responsive to the vector attribute.

11. The processor as recited in claim 10 wherein the first predicate vector applies to each of the one or more vectors.

12. The processor as recited in claim 11 wherein the first instruction operation further includes a destination vector register operand, and wherein the issue circuit is configured to issue the first instruction operation further responsive to a dependency on the destination vector register being resolved.

13. The processor as recited in claim 12 wherein the first instruction operation specifies that inactive vector elements of the destination vector register are unmodified in response to execution of the first instruction operation.

14. The processor as recited in claim 10 wherein the first instruction operation specifies that inactive vector elements are zero in a result vector of the first instruction operation.

15. The processor as recited in claim 10 wherein the issue circuit is configured to qualify the first predicate vector with the vector attribute.

16. The processor as recited in claim 15 wherein the issue circuit is configured to determine a number of elements in the first predicate vector responsive to the vector attribute.

17. The processor as recited in claim 16 wherein the number of elements in the first predicate vector is equal to the number of elements in each of the one or more vectors.

18. A method comprising:
detecting that a predicate vector corresponding to a first instruction operation is null in an issue circuit in a processor;
issuing the first instruction operation for execution to an execution unit in the processor responsive to the detecting even though at least one source operand of the first instruction operation is not resolved;

executing the first instruction operation in the execution unit independent of the unresolved source operand; and forwarding a result of the first instruction operation from the execution unit to a dependent instruction operation, wherein the forwarding is independent of the unresolved source operand and the result is forwarded prior to resolving the dependency on the unresolved source operand.

19. The method as recited in claim 18 wherein a first predicate vector register storing the predicate vector further stores a vector attribute field storing a vector attribute, wherein issuing the first instruction operation is further responsive to qualifying the predicate vector with the vector attribute.

20. The method as recited in claim 19 further comprising determining a number of elements in the predicate vector responsive to the vector attribute.

* * * * *